United States Patent
Savry et al.

(10) Patent No.: US 12,326,933 B2
(45) Date of Patent: Jun. 10, 2025

(54) METHOD FOR PROTECTING AGAINST SIDE-CHANNEL ATTACKS

(71) Applicant: COMMISSARIAT A L'ENERGIE ATOMIQUE ET AUX ENERGIES ALTERNATIVES, Paris (FR)

(72) Inventors: Olivier Savry, Grenoble (FR); Ezinam-Bertrand Talaki, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 198 days.

(21) Appl. No.: 18/159,800

(22) Filed: Jan. 26, 2023

(65) Prior Publication Data
US 2023/0281305 A1 Sep. 7, 2023

(30) Foreign Application Priority Data
Mar. 7, 2022 (FR) .................................. 22 01933

(51) Int. Cl.
*G06F 21/56* (2013.01)
*G06F 21/55* (2013.01)
*G06F 21/60* (2013.01)

(52) U.S. Cl.
CPC .......... *G06F 21/556* (2013.01); *G06F 21/602* (2013.01)

(58) Field of Classification Search
CPC .................................................... G06F 21/556
See application file for complete search history.

(56) References Cited

U.S. PATENT DOCUMENTS

| 5,859,912 | A | 1/1999 | Hershey et al. |
| 10,719,632 | B2 * | 7/2020 | Persson .............. G06F 12/1441 |
| 11,341,282 | B2 * | 5/2022 | Savry ........................ G06F 8/44 |
| 2007/0177720 | A1 * | 8/2007 | Bevan ................... H04L 9/0618 |
| | | | 380/28 |
| 2012/0121079 | A1 * | 5/2012 | Bolotov ................ G06F 21/602 |
| | | | 380/28 |
| 2012/0222134 | A1 * | 8/2012 | Orsini ................... G06F 21/606 |
| | | | 726/28 |
| 2012/0297110 | A1 | 11/2012 | Kavi |

(Continued)

OTHER PUBLICATIONS

French Preliminary Search Report issued Oct. 18, 2022 in FR 22 01933 filed on Mar. 7, 2022, 12 pages (with English Translation of Category of Cited Documents).

(Continued)

*Primary Examiner* — Ponnoreay Pich
(74) *Attorney, Agent, or Firm* — Oblon, McClelland, Maier & Neustadt, L.L.P.

(57) ABSTRACT

A method including generating an initialization vector, then producing a new mask using the generated initialization vector and using a secret key, masking a datum to be written to an internal cache memory using the constructed new mask, to obtain a masked datum, storing, in a given word of the internal cache memory, the masked datum and the generated initialization vector, and unmasking the masked datum, this including extracting the initialization vector contained in the word, reconstructing the mask using the extracted initialization vector and using the secret key, then unmasking the masked datum using the new mask thus reconstructed.

11 Claims, 2 Drawing Sheets

(56) References Cited

U.S. PATENT DOCUMENTS

| | | | |
|---|---|---|---|
| 2015/0098564 A1* | 4/2015 | Chamley | H04L 9/0631 |
| | | | 380/28 |
| 2015/0363334 A1* | 12/2015 | Mundra | G06F 12/1408 |
| | | | 713/193 |
| 2017/0214523 A1 | 7/2017 | Pebay-Peyroula et al. | |
| 2019/0197259 A1* | 6/2019 | Bettale | G06F 21/602 |
| 2019/0349187 A1 | 11/2019 | Do Canto et al. | |
| 2020/0004992 A1* | 1/2020 | Chong | G06F 21/6218 |
| 2020/0349294 A1* | 11/2020 | Savry | G06F 8/44 |
| 2021/0083840 A1* | 3/2021 | Tunstall | H04L 9/3249 |
| 2021/0097206 A1 | 4/2021 | Wierzynski et al. | |
| 2023/0111089 A1* | 4/2023 | Sarno | G06F 7/764 |
| | | | 708/200 |
| 2023/0281305 A1* | 9/2023 | Savry | G06F 21/556 |
| | | | 726/22 |

OTHER PUBLICATIONS

Daemen, J. et al. "The Subterranean 2.0 cipher suite" Radboud University, Digital Security Department, Nijmegen, 2019 (29 pages).

* cited by examiner

METHOD FOR PROTECTING AGAINST SIDE-CHANNEL ATTACKS

The invention relates to a method for protecting an electronic computer against side-channel attacks. It also relates to an electronic computer for implementing this method.

Typically, electronic computers comprise a data storage medium, such as a main memory, and a system-on-chip that executes instructions stored in this main memory, in order to process data. The data are generally also stored in this main memory. Systems-on-chip are better known by the acronym SoC. Such a system-on-chip generally comprises one or more internal cache memories, a central processing unit and one or more internal buses connecting the one or more internal cache memories to the central processing unit.

The central processing unit is more commonly referred to as the CPU.

To protect data transiting between the main memory and the system-on-chip, it is known to encrypt them. In this case, the data moved from the main memory to the system-on-chip are decrypted on entering the system-on-chip and then transit in the clear over the internal buses of the system-on-chip.

In this text, a datum that is "in the clear" or "plaintext" is a datum that is not protected and that is therefore exploitable directly without needing to be decrypted or unmasked beforehand.

It is very difficult to read a datum from the internal cache memory of a system-on-chip. In contrast, it has been observed that the values of the data transiting in the clear over the internal buses of the system-on-chip may quite easily be obtained through a side-channel attack.

Prior art is known from US 2012/297110 A1, US 2017/214523 A1, U.S. Pat. No. 5,859,912 A and US 2019/349187 A1. None of these documents describes the claimed solution.

The invention aims to make such side-channel attacks more difficult.

Another subject of the invention is an electronic computer for implementing this method.

The invention will be better understood on reading the following description, which is given solely by way of non-limiting example, with reference to the drawings, in which.

In the remainder of this description, features and functions that are well known to those skilled in the art are not described in detail.

In this description, detailed examples of embodiments are first described in Section I with reference to the figures. Subsequently, in Section II, variants of these embodiments are presented. Lastly, the advantages of the various embodiments are introduced in Section III.

SECTION I: EXAMPLES OF EMBODIMENTS

Figure 1:
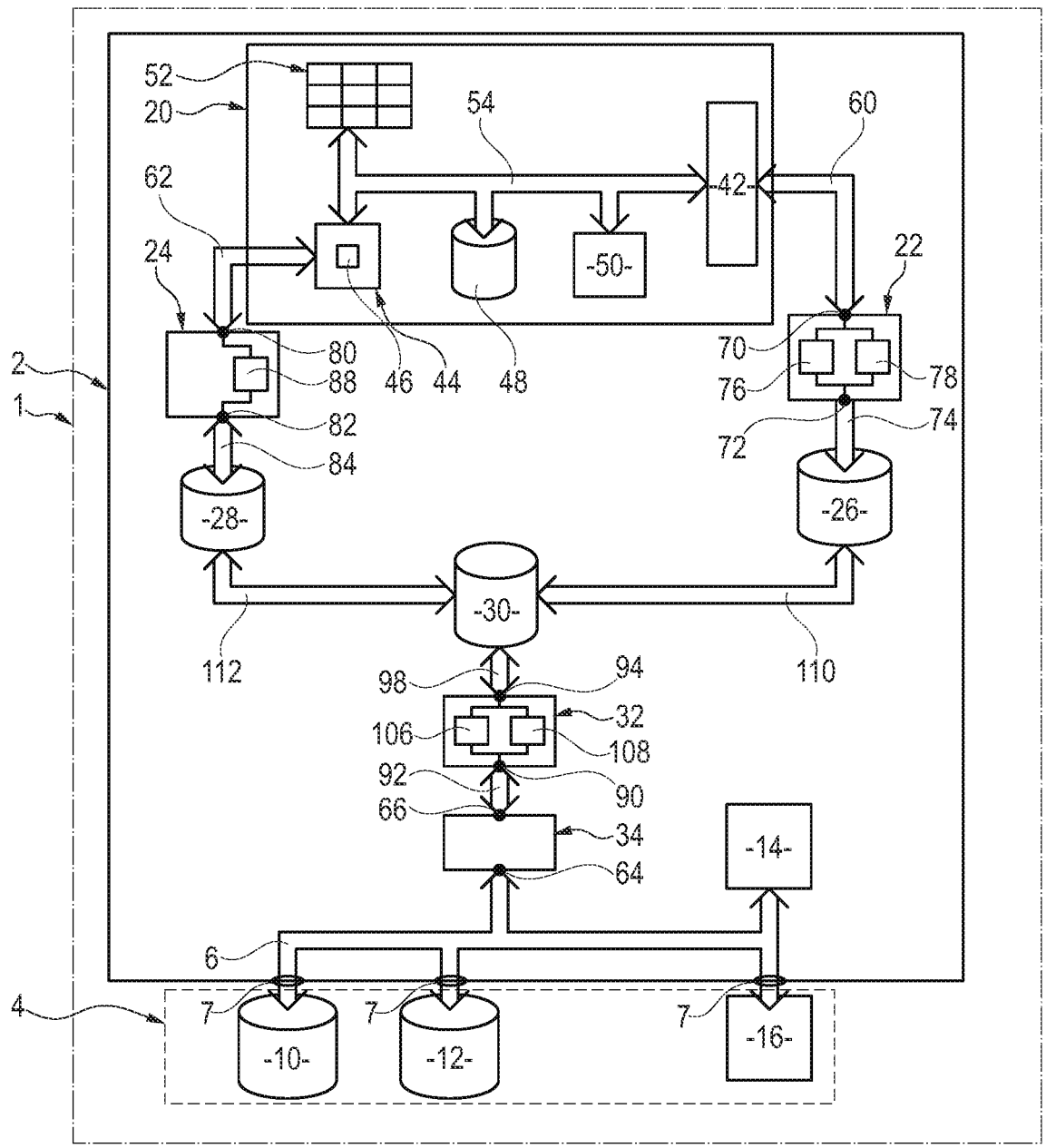
FIG. 1 is a schematic illustration of the architecture of an electronic computer.

FIG. 1 shows an electronic computer 1 comprising a system-on-chip 2 and a set 4 of external components. For example, the computer 1 is the processor of a desktop computer, of a smartphone, of an electronic tablet or the like.

The system 2 comprises a main interconnection bus 6 that allows the system 2 to be connected to the various external components of the set 4. To this end, the bus 6 is connected to input/output ports 7 of the system 2. The bus 6 typically comprises:
  a data bus over which are transmitted words, and
  an address bus over which are transmitted the addresses from or to which these words must be read or written.

Hereinafter, to simplify the figures, only data buses have been shown.

By way of illustration, in this example of embodiment, the set 4 comprises the following components, which are each connected to the bus 6:
  a data storage medium 10,
  a bulk memory 12 such as a flash memory, and
  a peripheral interface 16 that allows data to be exchanged between the system 2 and one or more peripherals.

The bus 6 may also be connected to internal components of the system 2. By way of illustration, here, the bus 6 is connected to a DMA controller 14, DMA standing for direct memory access.

In this example of embodiment, the medium 10 is a volatile main memory in which are stored data to be processed by the system 2 and the instructions of one or more processes executed by the system 2 to process these data.

The system 2 is a semiconductor chip into which are integrated all of the components required to execute the instructions stored on the medium 10 in order to process the data also stored on the same medium. Here, only the components of the system 2 that are necessary to understand the invention are shown and described.

The system 2 comprises:
  a central processing unit 20,
  two first hardware circuits 22 and 24 for protecting against side-channel attacks,
  two internal cache memories 26 and 28,
  an internal cache memory 30,
  a second hardware circuit 32 for protecting against side-channel attacks, and
  a cryptographic hardware circuit 34 for encrypting and decrypting.

The various components of the system 2 are connected to one another by way of internal data buses and address buses.

The central unit 20 typically comprises:
  a data input/output interface 42,
  an instruction loader 44 comprising a program counter 46,
  a queue 48 of instructions to be executed,
  an arithmetic logic unit 50 able to execute one after another the instructions contained in the queue 28,
  a set 52 of registers, and
  buses 54 that connect to one another the various above elements of the central unit 20.

The interface 42 connects the central unit 20 to the protecting circuit 22 via an internal data bus 60 for reading and writing data to the cache memory 26. Typically, the interface 42 transfers data between the set 52 of registers and the cache memory 26.

The bus 60 makes it possible to transport between the central unit 20 and the protecting circuit 22, in a single clock cycle, one word $W_j$ the size $T_W$ of which is larger than the size $T_D$ of one datum $D_j$. In this text, the index j identifies the datum $D_j$. Typically, the size $T_D$ is larger than 16 bits or 32 bits or 64 bits. In this first example of embodiment, the size $T_D$ is equal to 64 bits.

Figure 4:
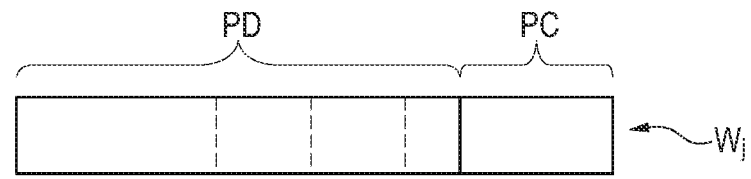
FIG. 4 is an illustration of the architecture of a word passed over the buses employed in the computer of FIG. 1.

As illustrated in FIG. 4, in this embodiment, the word $W_j$ is divided into two successive ranges of bits:
  a range PD of 64 bits that contains the bits coding the datum $D_j$, and
  a range PC intended to contain plaintext metadata $MC_j$.

In this example of embodiment, the metadata $MC_j$ notably comprise an initialization vector $iv_j$ that will be described below. The size $T_{iv}$ of this initialization vector $iv_j$ is typically larger than 4 bits or 8 bits or 16 bits. In this example, the size $T_{iv}$ is equal to 8 bits. Thus, the size $T_W$ of the word $W_j$ is here larger than or equal to 72 bits.

The loader 44 is connected to the protecting circuit 24 via an internal bus 62 for loading the instructions to be executed from the cache memory 28. More precisely, the loader 44 loads the instruction to which the program counter 46 points. To this end, the program counter 46 contains the address of the next instruction to be executed. The loader 44 stores each loaded instruction, one after another, in the queue 48.

The bus 62 is identical to the bus 60. Thus, the size of the words transported over this bus 62 is equal to $T_W$.

The arithmetic logic unit 50 executes one after another the instructions contained in the queue 48. The instructions executable by the arithmetic logic unit 50 notably comprises:
  instructions to load, for example into one of the registers of the set 52, a datum located at a specified address on the medium 10,
  instructions to write a datum, for example currently present in one of the registers of the set 52, to a specified address on the medium 10, and
  instructions to process data that process the data, for example contained in the set 52 of registers, and that store the result of this processing, for example, also, in the set 52 of registers.

The cache memories 26, 28 and 30 form a two-level cache-memory architecture that allows the transfer of data and instructions between the medium 10 and the central unit 20 to be accelerated. The cache memories are classed in order of the speed at which data can be read, the first-level cache memory being the fastest. In addition, generally, the size of the cache memories increases with the level of the cache memory. Thus, the size of the first-level cache memory is smaller than the size of the second-level cache memory. The first and second cache-memory levels are conventionally called "L1" and "L2". Here, the cache memories 26 and 28 are first-level cache memories and the cache memory 30 is a second-level cache memory. In this embodiment, the cache memory 26 is solely used to store data whereas the cache memory 28 is solely used to store instructions.

The data and instructions stored on the medium 10 are stored in encrypted form. To do this, the cryptographic circuit 34 encrypts each datum to be written to the medium 10 before it is deposited on the bus 6. Reciprocally, the cryptographic circuit 34 decrypts each datum or instruction loaded from the medium 10 to obtain a decrypted datum or a decrypted instruction. Thus, after the cryptographic module 34, the data and instructions transiting over the internal buses of the system 2 are not encrypted.

To this end, the cryptographic circuit 34 comprises an input/output port 64 connected to the port 7 in order to receive encrypted data or instructions from the data bus 6 and, in alternation, to deposit encrypted data or instructions thereon. It also comprises an input/output port 66 to which it delivers the decrypted datum or instruction and, in alternation, from which it receives in the clear the datum to be deposited on the bus 6.

To encrypt and decrypt the data and instructions stored on the medium 10, the cryptographic circuit 34 executes, for example, a predetermined symmetric encryption/decryption algorithm. To this end, it uses a secret key $k_{10}$. The encryption algorithm used may be a block cipher or a stream cipher. Generally, the cryptographic circuit 34 constructs a data row $LD_j$ that contains the cryptogram $D_j^*$ of the datum $D_j$. This data row $LD_j$ may also contain other information such as:
  an authentication code MAC that allows the integrity and authenticity of the cryptogram $D_j^*$ to be verified,
  an error detection code $ECC_{Lj}$ that allows the integrity of the code $MAC_j$ and of the cryptogram $D_j^*$ to be checked and, potentially, any detected error to be corrected.

Similarly, each instruction is generally stored in an instruction row $LI_j$. The structure of such an instruction row is for example identical to the structure of the data row $LD_j$ except that the cryptogram contained in this instruction row is the cryptogram of the instruction and not the cryptogram of a datum.

The protecting circuits 22, 24 and 32 are constructed so as to prevent a side-channel attack from being able to reveal the values of the data and instructions transiting over the internal buses of the system 2 and notably over the internal bus that connects the internal cache memories to one another. To this end, the circuits 22, 24 and 32 mask the data and instructions transiting between the memory 30 and the cache memories 26 and 28. More precisely, here:
  the circuit 22 is configured to mask each datum written to the cache memory 26 by the central unit 20 and to unmask each datum loaded by the central unit 20 from the cache memory 26,
  the circuit 24 is configured to unmask each instruction loaded by the central unit 20 from the cache memory 28, and
  the circuit 32 is configured to mask each datum or instruction moved from the medium 10 to the cache memory 30 and to unmask each datum moved from the cache memory 30 to the medium 10.

To this end, the protecting circuit 22 is interposed between the central unit 20 and the cache memory 26 and, more precisely, between the interface 42 and the cache memory 26. Thus, all data moved between the central unit 20 and the cache memory 26 pass through the circuit 22. Here, the circuit 22 comprises:
  an input/output port 70 connected to that end of the bus 60 which is opposite the interface 42, and
  an input/output port 72 connected to an internal bus 74 the other end of which is connected to the cache memory 26.

The size of the bus 74 is identical to the size of the bus 60.

The circuit 22 notably comprises a masking module 76 and an unmasking module 78. The module 76 receives, via the port 70, the datum $D_j$ to be masked then masks this datum to obtain a masked datum $D_j^M$ and deposits the masked datum $D_j^M$ on the bus 74 so that it may be stored in the cache memory 26. To this end, the module 76 is able to construct a new mask $M_j$ for each new datum $D_j$ to be masked.

The module 78 receives, via the port 72, a masked datum $D_j^M$ deposited on the bus 74 by the cache memory 26. In response, the module 78 unmasks this masked datum $D_j^M$ and deposits the unmasked datum $D_j$ on the bus 60.

Although shown in FIG. 1 in the form of two distinct blocks, the modules 76 and 78 comprise common circuits and notably a common circuit for constructing the mask $M_j$ from the initialization vector $iv_j$.

The protecting circuit 24 is interposed between the central unit 20 and the cache memory 28 and, more precisely, between the loader 42 and the cache memory 28. Thus, any instruction moved from the cache memory 28 to the queue 48 first passes through the circuit 24. Here, the circuit 24 comprises:
- an input/output port 80 connected to that end of the bus 62 which is opposite the loader 44, and
- an input/output port 82 connected to an internal bus 84 the other end of which is connected to the cache memory 28.

The size of the bus 84 is identical to the size of the bus 62.

The circuit 24 comprises an unmasking module 88 that is identical to the unmasking module 78.

The protecting circuit 32 is interposed between the port 66 of the cryptographic circuit 34 and the cache memory 30. To this end, it comprises:
- an input/output port 90 connected to the end of an internal bus 92 the other end of which is connected to the port 66 of the cryptographic circuit 34, and
- an input/output port 94 connected to the end of an internal bus 98 the other end of which is connected to the cache memory 30.

The size of the buses 92 and 98 is equal to the size $T_W$.

The circuit 32 comprises a masking module 106 and an unmasking module 108 that are identical to the masking module 76 and to the unmasking module 78, respectively.

In FIG. 1, the internal buses that connect the cache memory 30 to the cache memories 26 and 28 have been designated by the references 110 and 112, respectively.

Figure 2:
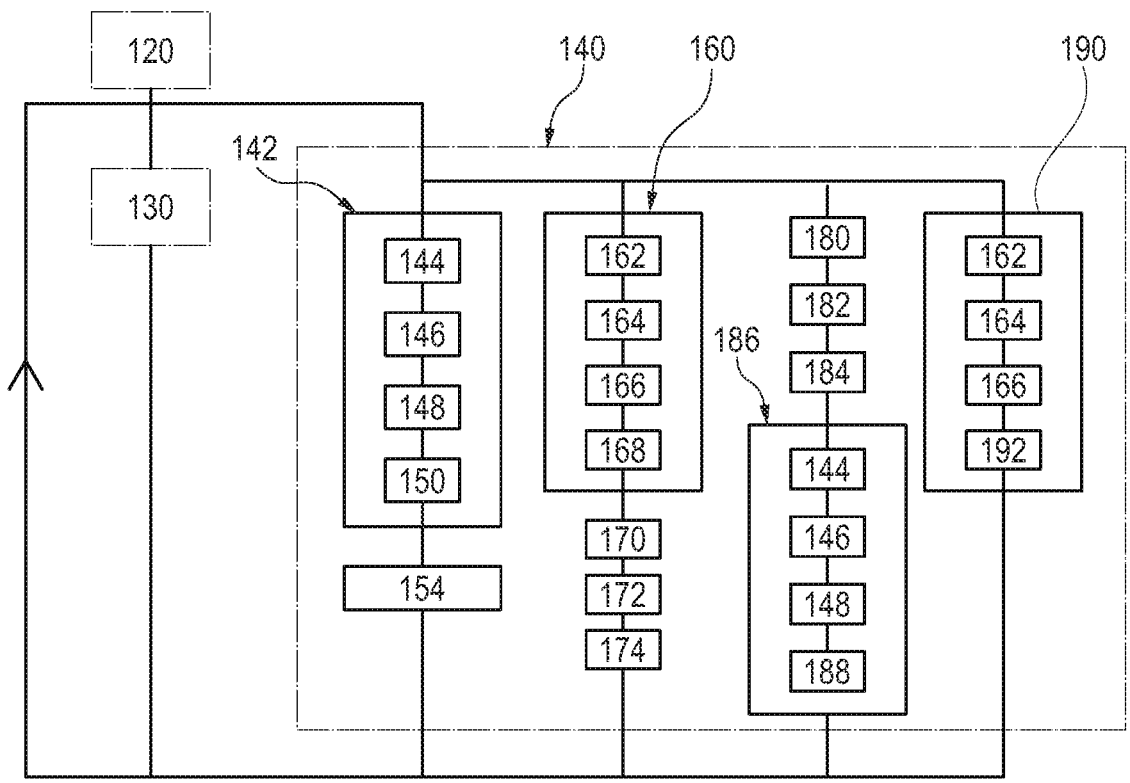
FIG. 2 is a flowchart of a method for protecting against side-channel attacks that is implemented in the electronic computer of FIG. 1.

The operation of the computer 1 will now be described with reference to FIG. 2. Below, only the steps that allow the system 2 to be protected against side-channel attacks are described in detail. In all other respects, the computer 1 operates in the conventional way.

In particular, the words $W_j$ are moved between the medium 10 and the cache memories 26, 28 and 30 so as to maximize the probability that the next word $W_j$ to be loaded by the central unit 20 will already be located in the cache memory 26 or 28 before loading of this word $W_j$ is triggered by the execution by the arithmetic logic unit 50 of a load instruction. This allows loading of this datum or this instruction to be accelerated. If the word $W_j$ cannot be found in the cache memory 26 or 28, the probability of it being located in the cache memory 30 is also maximized again in order to load this word $W_j$ into the central unit 20 more quickly. In other words, management of the cache memories is organized to minimize the occurrence of cache misses. Many mechanisms for managing cache memories 26, 28 and 30 are known. In addition, the protecting method described below operates whatever the mechanism used to manage the cache memories. Thus, the mechanism used to manage the cache memories 26, 28 and 30 is not described in detail.

Similarly, the way in which encrypted data and instructions are stored on the medium 10 is known and is therefore not described in detail.

Lastly, also as known per se, during execution of a process, an identifier of this process is generated. This process identifier makes it possible to uniquely identify the process to be executed among the various processes capable of being executed by the computer 1. One such process identifier is known by the acronym ASID (standing for Address Space Identifier). Below, this process identifier is therefore called the "ASID". The ASID is conventionally used to prevent a process from accessing data pages reserved for another process. This ASID is located in a range of bits of the address of the datum $D_j$ to be moved between the memories of the computer 1.

Initially, in a phase 120, a secret key $k_p$ is stored in the protecting circuits 22, 24 and 32. For example, the key $k_p$ is loaded each time execution of a new process is triggered. Thus, here, the key $k_p$ varies depending on the process to be executed. In this example, the size of the key $k_p$ is equal to 128 bits.

Next, in a phase 130, the central unit 20 executes a process and, to do so, instructions and data are moved between the medium 10 and the cache memories 26, 28 and 30 and the central unit 20. Typically, the loader 44 loads the instructions of the process to be executed one after another into the queue 48, then the arithmetic logic unit 50 executes the instructions loaded into this queue 48. To load an instruction, the loader 44 deposits, on an address bus, the address contained in the program counter 46. In response, if the instruction to be loaded is already located in the cache memory 28, the latter is immediately deposited on the bus 82. In contrast, if the instruction to be loaded is not located in the cache memory 28, it is moved to the cache memory 28 before being deposited on the bus 84. In the latter case:
- if the instruction to be loaded is in the cache memory 30, it is moved from the cache memory 30 to the cache memory 28 through the bus 112, or
- if the instruction to be loaded is also not located in the cache memory 30, it is moved in succession from the medium 10 to the cache memory 30 through the bus 6, the cryptographic circuit 34 and the internal buses 92 and 98, then from the cache memory 30 to the cache memory 28 through the bus 112.

On its passage through the cryptographic circuit 34, the cryptogram $I_m^*$ of the instruction $I_m$ to be loaded is decrypted then the instruction $I_m$ is transmitted and deposited in the clear on the bus 92. The index m is an identifier of the instruction $I_m$. Thus, before the cryptographic circuit 34, the instructions are encrypted, whereas after the cryptographic circuit 34, the instructions are in the clear.

In this example, instructions are never moved from the central unit 20 to the cache memories 28, 30 and to the medium 10.

If the instruction executed by the central unit 20 is an instruction to load a datum $D_j$, the address $@_j$ of the datum $D_j$ to be loaded is deposited on an address bus. In response, if the datum to be loaded is already located in the cache memory 26, the latter is immediately deposited on the bus 74. In contrast, if the datum $D_j$ to be loaded is not already located in the cache memory 26, it is moved to this cache memory 26 before being deposited on the bus 74. In this case, as described above in the case of an instruction $I_m$, there are two potential cases depending on whether the datum to be loaded is already located in the cache memory 30 or is not already located therein.

If the instruction executed by the central unit 20 is an instruction to write a datum $D_j$ to the medium 10, the address $@_j$ to which this datum must be written is deposited on the address bus and the datum $D_j$ is deposited on the bus 60. Typically, the datum $D_j$ is then first stored in the cache memory 26. Next, it is the mechanism for managing the cache memories that selects, depending on predefined rules, the data of the cache memory 26 to move to the cache memory 30 and the data of the cache memory 30 to move to the medium 10. When the data are moved from the cache memory 26 to the cache memory 30, they transit through the internal bus 110. When the data are moved from the cache memory 30 to the medium 10, they transit through the bus 6.

When a datum $D_j$ is moved from the cache memory 30 to the medium 10, it passes through the cryptographic circuit 34. On passing through the latter, the datum $D_j$ is encrypted and its cryptogram $D_j^*$ is incorporated into a row $LD_j$. Next, the row $LD_j$ is stored in the medium 10 at the address $@_j$.

In parallel, in a phase 140, the circuits 22, 24 and 32 protect the data and instructions moved over the internal bus of the system 2 against side-channel attacks.

To do this, in a step 142, the module 76 masks each datum $D_j$ moved from the central unit 20 to the cache memory 26. To this end, it constructs a new mask $M_j$ the size $T_M$ of which, in number of bits, is equal to the size $T_D$ of the datum $D_j$.

More precisely, in an operation 144, the module 76 generates a new initialization vector $iv_j$. For example, here, the initialization vector $iv_j$ is drawn randomly. The size $T_{iv}$ of this initialization vector $iv_j$ is two times smaller than the size $T_D$ of the datum $D_j$ to be masked and preferably eight or sixteen times smaller than the size $T_D$. Here, as indicated above, in this embodiment, the size $T_{iv}$ is equal to 8 bits.

Next, in an operation 146, the module 76 produces the new mask $M_j$ from the generated vector $iv_j$. In order for the statistical distribution of the values of the produced mask $M_j$ to be as close as possible to a uniform statistical distribution, the mask $M_j$ is here, in addition, produced using information that varies depending on the executed process, depending on the value of the datum $D_j$ and/or depending on the address $@_j$ of the datum $D_j$. Here, the mask $M_j$ is also produced using:

the key $k_p$,
the address $@_j$ of the datum $D_j$, and
the ASID.

The address $@_j$ and the ASID are obtained from the memory management unit (MMU). The key $k_p$ is stored in the protecting circuit 22 beforehand.

Here, to produce the new mask $M_j$, a block of 257 bits, called state "S", is first constructed from the values of the vector $iv_j$, from the key $k_p$, from the address $@_j$ and from the ASID. For example, the bits of the key $k_p$, of the vector $iv_j$, of the address $@_j$ and of the ASID are concatenated to obtain a first block of bits. This first block of bits is completed by a constant stored beforehand in each of the protecting circuits, to obtain a second block of 257 bits. Lastly, the bits of this second block are permutated by implementing a predefined permutation to obtain the state S. This permutation is wired and therefore is executed in a single clock cycle. For example, this wired permutation is identical to one of the permutations of the DES encryption/decryption algorithm (DES standing for Data Encryption Standard).

Next, a cryptographic function $F_c$ is applied to the state S to maximize the entropy of the produced mask $M_j$. Application of the function $F_c$ to the state S produces a state $S_D$ of higher entropy than the state S. The state $S_D$ is also a block of 257 bits.

Figure 3:
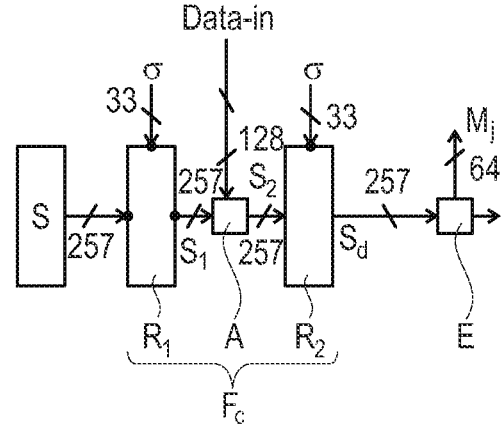
FIG. 3 is a schematic illustration of the architecture of a mask generator implemented in the computer of FIG. 1.

To this end, the function $F_c$ is designed so as to diffuse a modification of one bit of the state S. In other words, modifying the value of a single bit of the state S leads to a modification of a plurality of bits of the state $S_D$. To do this, here, the function $F_c$ is the composition of a permutation function p( ) and of a substitution function s( ). The function p( ) permutes bits of the state S and, preferably, permutes at least 50% or 60% of the bits of the state S. The function s( ) replaces at least 50% or 70% of the bits of the state S with other bits. For example, to do this, the function s( ) comprises a pre-recorded lookup table that, with each initial series of m bits, associates a different series of m bits. The function $F_c$ used in this embodiment is shown in FIG. 3. In this figure, the symbol "/" beside a numeral designates the size of the data bus crossed by the "/" symbol. Thus, the symbol "/" beside the numeral "128" means that the size of the bus crossed by this symbol is equal to 128 bits.

In FIG. 3, the state S has been represented by a rectangle containing the letter S. The function $F_c$ comprises a first round $R_1$ that receives as input the state S and that generates as output an intermediate state $S_1$. The state $S_1$ is a block of 257 bits. The round $R_1$ is a hardware circuit that performs, inter alia, permutations and substitutions of the bits of the state S to obtain the state $S_1$. For example, here, the round $R_1$ is identical to a round of the "Subterranean 2.0" encryption algorithm described in the article: J. Daemnen et al.: "*The Subterranean 2.0 Cipher suite*", version of 29 Mar. 2019. In particular, FIG. 3 of this article illustrates a hardware circuit for implementing this round $R_1$. The round $R_1$ has an input that receives the state S and an input that receives a block a of 33 bits. The block a is, for example, a predetermined and constant block of 33 bits.

Next, the function $F_c$ comprises an absorption circuit "A" that substitutes for 128 predetermined bits of the intermediate state $S_1$, the 128 bits of a block data_in to obtain a new intermediate state $S_2$. In this example of embodiment, the block data_in is constructed, by applying a predetermined algorithm, using the vector $iv_j$ and using the address $@_j$ before the function $F_c$ is executed. For example, the positions of the 128 bits of the state $S_1$ to be replaced by the 128 bits of the block data_in are defined by the following relationship: $POS_i = 12^{4k+p} \mod(257)$, where:

$POS_i$ is the position in the block of the bit $S_1$ to be replaced,
i is an integer that varies from 0 to 127,
if the index i belongs to the interval [0; 31], p=0 and k=i,
if the index i belongs to the interval [32; 63], p=1 and k=i−32,
if the index i belongs to the interval [64; 95], p=2 and k=i−64, and
if the index i belongs to the interval [96; 127], p=3 and k=i−96,
the function mod(257) is the modulo function, i.e. the function that returns the remainder of the Euclidean division of $12^{4k+p}$ by 257.

The bits of the intermediate state $S_2$ are then input into a new round $R_2$ that delivers as output the state $S_D$. Here, the round $R_2$ is identical to the round $R_1$.

After the function $F_c$ has been applied to the state S to obtain the state $S_D$, the mask $M_j$ is obtained by extracting 128 bits, located at predetermined positions, from the state $S_D$. The circuit that carries out this extraction has been designated by the letter E in FIG. 3. The circuit E constructs the value of the bit $Z_i$ located at position i in the mask $M_j$ using the following relationship: $Z_i = s_{12(4k+p)} + s_{-12(4k+p)}$, where:

the index i varies from 0 to 63,
$s_{12(4k+p)}$ is the value of the bit located at position $12^{4k+p} \mod(257)$ in state $S_D$,
$s_{-12(4k+p)}$ is the value of the bit located at position $-12^{4k+p} \mod(257)$ in state $S_D$,
if the index i belongs to the interval [0; 31], p=0 and k=i,
if the index i belongs to the interval [32; 63], p=1 and k=i−32, and
the symbol "+" designates the "OR" logic operation.

Once the new mask $M_j$ has been constructed, in an operation 148, the module 76 masks the datum $D_j$ with the mask $M_j$ to obtain the masked datum $D_j^M$. This operation is defined by the following relationship: $D_j^M=D_j$ XOR $M_j$, where the symbol XOR designates the "exclusive or" logic operation.

In an operation 150, the module 76 stores the masked datum $D_j^M$ in the cache memory 26. In this operation, the vector $iv_j$ used to construct the mask $M_j$ is also stored in the cache memory 26 in association with the masked datum $D_j^M$. To do this, the module 76 generates the word $W_j$ that contains the masked datum $D_j^M$ in the range PD and the vector $iv_j$ in the range PC. Thus, the word $W_j$ stored in the cache memory 26 contains, in addition to the masked datum $D_j^M$, the vector $iv_j$. The plaintext datum $D_j$ is not stored in the memory 26. The mask $M_j$ is also not stored in the cache memory 26.

If, subsequently, the word $W_j$ is moved by the mechanism for managing the cache memories, from the cache memory 26 to the cache memory 30, then, in a step 154, the word $W_j$ stored in the cache memory 26 is deposited on the bus 110. Since this word $W_j$ solely contains the masked datum $D_j^M$, only this masked datum $D_j^M$ transits over the bus 110. In addition, the masked datum $D_j^M$ is moved at the same time as the vector $iv_j$. Therefore, the word $W_j$ stored in the cache memory 30 simply contains the masked datum $D_j^M$ and the vector $iv_j$ and not the plaintext datum $D_j$ and the complete mask $M_j$.

If, subsequently, the word $W_j$ is moved by the mechanism for managing the cache memories, from the cache memory 30 to the medium 10, then the word $W_j$ passes in succession through the unmasking module 108 and the cryptographic circuit 34.

In a step 160, the module 108 unmasks the masked datum $D_j^M$ before transmitting it to the cryptographic circuit 34.

To do this, in an operation 162, the module 108 extracts the vector $iv_j$ from the range PC of the word $W_j$.

Next, in an operation 164, the module 108 reconstructs the mask $M_j$ using:
- the key $k_p$,
- the extracted vector $iv_j$,
- the address $@_j$ of the datum $D_j$, and
- the ASID.

Operation 164 is identical to operation 146 except that it is executed by the module 108. In particular, the same function $F_c$ is used in operation 164.

Once the mask $M_j$ has been reconstructed, in an operation 166, the module 108 unmasks the masked datum DIM. This operation is defined by the following relationship: $D_j=D_j^M$ XOR $M_j$.

In an operation 168, the module 108 generates a new word $W_j$ and deposits it on the bus 92 with a view to transmission thereof to the cryptographic circuit 34. This new word $W_j$ contains the unmasked datum $D_j$ in the range PD. At this stage, for example, this new word $W_j$ does not contain the vector $iv_j$.

In a step 170, the cryptographic circuit 34 encrypts the datum $D_j$ contained in the received word $W_j$. For example, here, it constructs a data row $LD_j$ that contains the cryptogram $D_j^*$ of the datum $D_j$.

In a step 172, once the row $LD_j$ has been constructed, the cryptographic circuit 34 moves it to the medium 10 through the bus 6.

In a step 174, the row $LD_j$ is stored on the medium 10.

In the reverse direction, the mechanism for managing the cache memories triggers the movement of a datum $D_j$ from the medium 10 to the cache memory 30. In this case, in a step 180, the row $LD_j$ is transferred, through the bus 6, from the medium 10 to the cryptographic circuit 34.

In a step 182, the cryptographic circuit 34 decrypts the cryptogram $D_j^*$ contained in the row $LD_j$ to obtain the plaintext datum $D_j$.

Next, in a step 184, the plaintext datum $D_j$ is moved from the cryptographic circuit 34 to the protecting circuit 32.

In a step 186, the masking module 106 masks the datum $D_j$ using a new mask $M_j$ to obtain the new masked datum $D_j^M$. This step 186 is identical to step 142 except that operation 150 is replaced by an operation 188 of storing the word $W_j$ containing the masked datum $D_j^M$ in the cache memory 30 and not in the cache memory 26.

Since the word $W_j$ simply contains the masked datum $D_j^M$, when this word $W_j$ is moved, through the bus 110 from the cache memory 30 to the cache memory 26, only the masked datum $D_j^M$ transits over this bus 110. In addition, the vector $iv_j$ is also moved at the same time from the cache memory 30 to the cache memory 26. Therefore, the word $W_j$ stored in the cache memory 26 contains both the masked datum $D_j^M$ and the vector $iv_j$, which allows the mask $M_j$ to be reconstructed.

In response to execution by the arithmetic logic unit 50 of an instruction to read the datum $D_j$, in a step 190, the module 78 unmasks the masked datum $D_j^M$ contained in the word $W_j$ stored in the cache memory 26. To do this, the module 78 uses the vector $iv_j$ contained in the same word $W_j$ as that containing the masked datum $D_j^M$. This step 190 is identical to step 160 except that operation 168 is replaced by an operation 192 in which the word $W_j$ containing the plaintext datum $D_j$ is deposited on the bus 60 with a view to transmission thereof to the central unit 20.

Movement of an instruction $I_m$ from the medium 10 to the central unit 20 is achieved as described for a datum $D_j$. It is possible to distinguish a word $W_m$ containing the instruction $I_m$ from a word $W_j$ containing a datum from the address $@_m$ of the instruction $I_m$. For example, the address $@_m$ contains a bit that indicates that the word $W_m$ contains an instruction. This bit is generated by the memory management unit.

Figure 5:
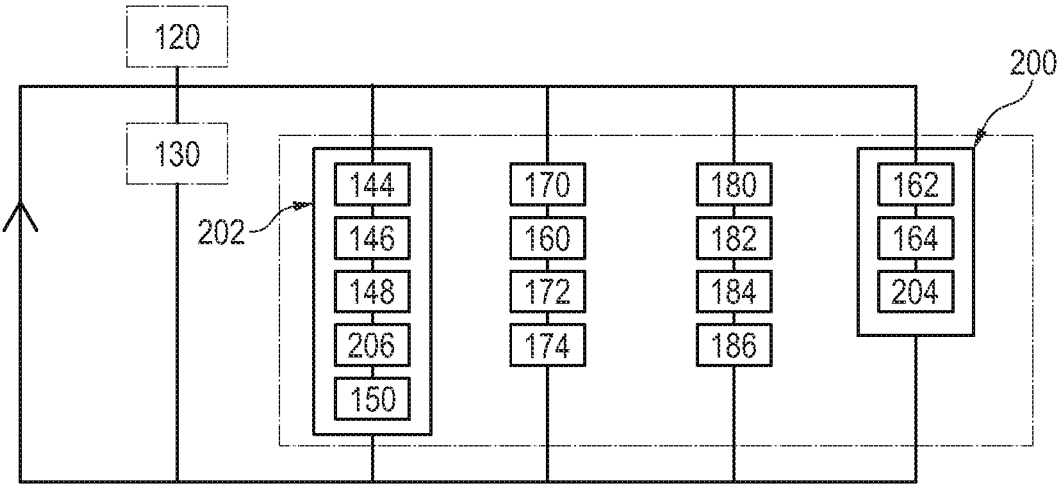
FIG. 5 is a flowchart of another embodiment of a method for protecting against side-channel attacks that is capable of being implemented in the computer of FIG. 1.

FIG. 5 shows an embodiment of a method for protecting data in which the data do not appear in the clear on the buses 60 and 92. This method is identical to the method of FIG. 2, with the exception of the following differences.

During the movement of a datum $D_j$ from the cache memory 30 to the medium 10, the order of the unmasking step 160 and of the encrypting step 170 is inverted. Thus, the datum $D_j$ does not appear in the clear on the bus 92. To do this, the locations of the circuits 32 and 34 are permutated with respect to what is shown in FIG. 1. In this case, the masked datum $D_j^M$ is first encrypted by the cryptographic circuit 34 to obtain a masked and encrypted datum $D_j^{M*}$. The word $W_j$ containing the masked and encrypted datum $D_j^{M*}$ and the vector $iv_j$ is then deposited on the bus 92 to be transmitted to the circuit 32. Next, the module 108 unmasks the masked and encrypted datum $D_j^{M*}$ to obtain the cryptogram $D_j^*$. To do this, for example, the encryption/decryption algorithm employed by the cryptographic circuit 34 is a stream cipher. Such an algorithm generates an encrypting sequence of bits using the key $k_{10}$, then combines this encrypting sequence with the datum to be encrypted to obtain the cryptogram of the datum. The operation used to combine the encrypting sequence in the plaintext datum is an "exclusive or" operation. It is as a result thereof that executing the encrypting operation first then the unmasking operation subsequently allows the same result to be obtained as executing the unmasking operation first and then the encrypting operation.

Likewise, to prevent the datum $D_j$ from transiting in the clear over the bus 60, step 190 is replaced by a step 200 and step 142 is replaced by a step 202.

Step 200 is identical to step 190 except that the unmasking operation 166 is omitted and operation 192 is replaced by an operation 204. In operation 204, the masked datum $D_j^M$ and the reconstructed mask $M_j$ are both transmitted to the central unit 20.

Next, in phase 130, the central unit 20 executes a processing operation on the masked datum $D_j^M$ to obtain a processed masked datum $D_j^{Mt}$. This processing operation is the result of execution of one or more instructions loaded by the loader 44 and which modifies the masked datum $D_j^M$. In parallel, in phase 130, the central unit 20 executes the same processing operation on the reconstructed mask $M_j$ to obtain a processed mask $M_j^t$.

In step 202, the central unit 20 moves the processed and masked datum $D_j^{Mt}$ and the processed mask $M_j^t$ to the cache memory 26. It is underlined that the mask $M_j^t$ cannot be reconstructed using a vector $iv_j$ as was the case for the mask $M_j$ before execution of the processing operation. Therefore, it is not possible to store in the cache memory 26 directly the processed and masked datum $D_j^{Mt}$ associated with an initialization vector that allows the mask $M_j^t$ to be reconstructed. To circumvent this difficulty, step 202 is identical to step 142 except that an additional unmasking operation 206 is inserted between operations 148 and 150.

Here, in step 202, the module 76 first executes operations 144, 146 and 148 to mask the processed and masked datum $D_j^{Mt}$ with a new mask $M_j$ constructed using a generated new vector $iv_j$. A doubly masked datum $D_j^{Mt,M}$ is then obtained at the end of operation 148.

In operation 206, module 76 unmasks the doubly masked datum $D_j^{Mt,M}$ with the mask $M_j^t$ and obtains the masked datum $D_j^M$. Next, operation 150 is executed to store the masked datum $D_j^M$ and the vector $iv_j$ in the cache memory 26.

SECTION II: VARIANTS

Variants of Production of the Mask $M_j$:
Other embodiments are possible to produce the new mask $M_j$ using the vector $iv_j$. For example, the state S may be established differently. In particular, the state S may be established using the vector $iv_j$, the key $k_p$ and only some or none of the data chosen from the group consisting of:
the ASID,
the address $@_j$ of the datum.

In another embodiment, if each datum $D_j$ is associated with an error detection or correction code, the value of this code may be integrated into the state S. Similarly, if the datum $D_j$ is associated with a message authentication code (MAC), at least some of this MAC is integrated into the state S.

In another variant, only some of the address $@_j$ or only some of the ASID is taken into account when producing the new mask $M_j$.

As a variant, the key $k_p$ is not process-specific. For example, this key $k_p$ is common to a plurality of processes or to all of the processes capable of being executed by the system 2.

In a very simplified variant, the key $k_p$ is omitted and is not used to construct the new mask $M_j$.

In another variant, what was described above is implemented at the same time as a method for protecting against erroneous pointer use. For example, this method for protecting against erroneous pointer use is the method described in patent application US20210004456A1. As explained in detail in patent application US20210004456A1, a pointer identifier $IP_j$ is associated with a datum $D_j$ when it is manipulated using a pointer. For example, to do this, this identifier $IP_j$ is integrated into the range PC of each word $W_j$ containing a datum $D_j$ manipulated via a pointer. In this case, this identifier $IP_j$ may be used to construct the new mask $M_j$. For example, this identifier $IP_j$ is integrated into the state S.

In one simplified other variant, the bit permutation used to obtain the state S may be omitted or be different from the one defined in the DES encryption algorithm.

In the function $F_c$, the substitution function so may be effected differently. For example, instead of using a predefined lookup table, the series of m bits that must be replaced by another series of m bits are computed and not stored beforehand.

The block data_in may be constructed differently. For example, it may be constructed using one or more of the following elements: the ASID, the key $k_p$, the address $@_j$ of the datum $D_j$, the vector $iv_j$ or any other metadatum associated with the datum $D_j$ such as a pointer identifier $IP_j$. In contrast, in one very simplified variant, the block data_in is a constant.

When the block data_in is constructed using the vector $iv_j$, it is not necessary to construct the state S using the vector $iv_j$. Reciprocally, when the state S is constructed using the vector $iv_j$, then it is not necessary to construct the block data_in using this vector $iv_j$.

Other embodiments of the cryptographic function $F_c$ are possible. For example, in variants, the function $F_c$ is a modified version of the AES encryption algorithm (AES standing for Advanced Encryption Standard). In this modified version, the number of rounds executed is only equal to two or three and therefore very much lower than the number of rounds conventionally executed on implementation of such an encryption algorithm.

There is no need for the function $F_c$ to be an invertible function. Thus, in variants, the function $F_c$ is a hash function. In this case, the number of bits of the state $S_D$ may be lower than the number of bits of the state S.

Variants of the Generation of the Vector $iv_j$:
The vector $iv_j$ may be generated differently. For example, in one simplified embodiment, a counter is incremented by a predetermined increment each time it is necessary to generate a new vector $iv_j$. The size of this counter is equal to the size $T_W$. When the maximum value of this counter is reached, its value automatically returns to zero. The values of the new vector $iv_j$ is then constructed using the incremented value of this counter. For example, the value of the new vector $iv_j$ is equal to the value of this counter.

The vector $iv_j$ may also be generated by executing a random permutation or a random substitution of one or more of the bits of a counter. The vector $iv_j$ may also be generated by shifting bits of this counter to the right or to the left.

The vector $iv_j$ may also be set equal to a predetermined selection of bits of one or more of the metadata $MC_j$ contained in the range PC. For example, in one embodiment, the range PC contains an integrity label $ET_j$ that allows the integrity of the datum $D_j$ to be verified. Such an integrity label is for example an error correction code or an error detection code. In a more complex variant, the label $ET_j$ may also be an authentication code such as a message authentication code (MAC). The vector $iv_j$ is then equal to a predetermined selection of the bits of the label $ET_j$. In this case, the bits of the vector $iv_j$ are used to perform two different functions, namely, to produce the mask $M_j$ and to verify the integrity of the datum $D_j$. This embodiment is advantageous in that it avoids the need to store in the range PC the vector $iv_j$ and, separately, the label $ET_j$.

In another variant, if the data row $LD_j$ stored in the medium 10 contains complementary information in addition to the cryptogram of the datum $D_j$, then the vector $iv_j$ may be generated by selecting, in a predetermined way, some of the bits of this complementary information. For example, if the method of patent application US 20210004456 A1 is employed to construct the row $LD_j$, this row $LD_j$ in addition contains an authentication code $MAC_j$. The vector $iv_j$ may then be constructed using some of the bits of this code $MAC_j$.

The vector $iv_j$ may also be generated using some of the bits of the cryptogram $D_j^*$ of the datum $D_j$ stored on the medium 10.

The module 76 may also generate the vector $iv_j$ using the vector $iv_{j-1}$ used to unmask the last datum $D_{j-1}$ moved from the cache memory 26 to the central unit 20.

Variants of the Architecture of the Computer

In variants, the protecting circuit 32 is omitted. In this case, the data written by the central unit 20 to the medium 10 remain masked, including when they are transiting over the bus 6. In this case, the cryptographic circuit 34 may also be omitted since the data stored on the medium 10 are masked and therefore already protected.

In variants, the instructions are not masked inside the system 2. In this case, the protecting circuit 24 is omitted. Thus, in the simplest embodiment, the system 2 simply comprises the protecting circuit 22 and the cryptographic circuit 34 is also omitted.

Other embodiments of the cryptographic module 34 are possible. In particular, other encrypting/decrypting methods may be employed.

The medium 10 may be any memory of rank lower than the first-level internal cache memories. Thus, in variants, the medium 10 is a memory of lower rank such as a cache memory of level L3 or L2. In this case, the protecting circuits and the cryptographic circuit are placed upstream of this memory of rank lower than that of the main memory.

The number of cache-memory levels may be lower than two. In this case, the cache memory 30 is omitted. The number of cache-memory levels may also be higher than two. For example, a cache memory of level L3 may be added.

The cache memories of level higher than the cache memory of level L1 may be external cache memories implemented outside of the system 2.

The internal cache memory is not necessarily the cache memory of lowest level, i.e. here a cache memory of level L1. For example, in variants, the internal cache memory is a cache memory of level L2. In this case, the protecting circuits 22 and 24 are interposed between the cache memories 26 and 28 and the cache memory 30.

Other Variants:

In variants, each word $W_j$ in addition contains a range PM of bits that is intended to contain metadata $MP_j$ that may be masked. For example, these metadata $MP_j$ contain an error correction code that allows an error in the datum $D_j$ to be corrected. In this case, the size of the word $W_j$ is equal to the sum of the sizes $T_D + T_{MC} + T_{MP}$, where the sizes $T_{MC}$ and $T_{MP}$ are the sizes of the metadata $MC_j$ and $MP_j$, respectively. In this variant, the protecting circuits are configured to generate a mask $M_j$ the size of which allows both the datum $D_j$ and the metadata $MP_j$ to be masked/unmasked. Thus, in this embodiment, the size $T_M$ of the mask $M_j$ is equal to the sum of the sizes $T_D$ and $T_{MP}$. Therefore, in such an embodiment, the metadata $MP_j$ are also protected against side-channel attacks in the same way as the data $D_j$. To obtain a mask $M_j$ of larger size, it is enough for example to increase the number of bits extracted from the state $S_D$.

A plurality of the variants described above may be combined in one and the same embodiment.

SECTION III: ADVANTAGES OF THE DESCRIBED EMBODIMENTS

Masking data transiting over the internal bus of the system 2 makes side-channel attacks more difficult because said data are masked and the mask $M_j$ required to unmask them cannot be easily reconstructed using only the vector $iv_j$. In addition, this mask $M_j$ changes each time the datum $D_j$ is loaded for the first time into the cache memories of the system 2. Storing, in the internal cache memories, only the vector $iv_j$ used to reconstruct the mask $M_j$ and not the complete mask $M_j$ allows the memory space required to store this mask $M_j$ to be limited. Thus, the memory space required to implement this method remains limited.

Producing the new mask $M_j$ using the address $@_j$ of the datum $D_j$ to be masked or unmasked increases the variability of the produced masks. This therefore improves protection against side-channel attacks.

Producing the new mask $M_j$ in addition using values of the ASID and/or of the metadata $MP_j$ allows the variability of the mask $M_j$ to be increased and therefore protection against side-channel attacks to be improved.

Unmasking the masked datum $D_j^M$ just before storing it on the medium 10 then encrypting it allows the memory space used to be limited. Specifically, in such a case, it is not necessary to store the vector $iv_j$ on the medium 10.

The fact that the datum $D_j$ is processed by the central unit 20 in masked form allows security to be increased because even within this central unit 20, the datum is protected. In addition, this makes side-channel attacks more difficult because even on the bus 60 the datum is masked.

Unmasking the masked datum $D_j^M$ solely in response to read-out of this datum from the cache memory 26 by the central unit 20 allows, using solely and simply the protecting circuit 22, the written data to be protected against side-channel attacks and the confidentiality of these data when they are subsequently moved to memories of lower rank to be ensured. Specifically, no matter what form the memory of lower rank takes, in such a case, in the absence of unmasking, the data are stored therein in masked form.

Using the composition of at least one permutation p( ) and of at least one substitution s( ) to generate the mask $M_j$ allows the entropy of this mask to be maximized and therefore side-channel attacks to be made more difficult.

The invention claimed is:

1. A method for protecting, against side-channel attacks, implemented by an electronic computer that includes a data storage medium and a system-on-chip, the system-on-chip including an internal cache memory divided into a plurality of words, a central processing unit able to write a datum to a word of the internal cache memory, an internal data bus through which transit words moved between the internal cache memory and the data storage medium, the size of said bus being equal to the size of one word of the internal cache memory, said method comprising the following steps:

a) protecting a datum contained in a word transiting, through the internal bus, between the internal cache memory and the data storage medium, by executing, for each datum written to the internal cache memory by the central processing unit, the following operations:

operation A): constructing a new mask the size of which, in number of bits, is equal to the number of bits of the datum to be written, then operation B): masking the datum to be written using the constructed new mask, to obtain a masked datum, then operation C): storing the masked datum, and not the unmasked datum to be written, in a word of the internal cache memory, then operation D): when said datum must be moved to the data storage medium, depositing on the internal bus the complete word containing the masked datum, b) unmasking the masked datum contained in a word, wherein:

operation A) of constructing a new mask comprises:
generating a new initialization vector the size of which, in number of bits, is two times smaller than the number of bits of the new datum to be written, then
producing the new mask using the generated new initialization vector and using a secret key and by executing a cryptographic function, operation C) of storing the masked datum in a word of the internal cache memory comprises storing, in the same word of the internal cache memory, the initialization vector wherein which said masked datum was obtained, and not storing in the internal cache memory the produced complete new mask, unmasking step b) comprises the following operations:
operation E): extracting the initialization vector contained in the word,
operation F): reconstructing the mask the size of which, in number of bits, is equal to the number of bits of the datum to be unmasked using the extracted initialization vector and using the secret key and by executing the same cryptographic function as that used in operation A), then
operation G): unmasking the masked datum using the new mask thus reconstructed, to obtain the unmasked datum.

2. The method according to claim 1, wherein, in operation A), the new mask is produced, in addition, using at least one portion of the physical address of the datum to be written.

3. The method according to claim 1, wherein, in operation A), the new mask is produced, in addition, using one or more values belonging to the group consisting:
of a value that varies depending on the process in course of execution by the system-on-chip,
of a metadatum contained in the same word as the word that contains the data to be masked, said metadatum being contained in a range of bits that is distinct from the range of bits of said word containing the datum to be masked, and
of a value coded by bits associated with the address of the datum to be masked, these bits being different from the bits coding the address of the datum to be masked.

4. The method according to claim 1, wherein the method comprises:
before storage of a datum on the data storage medium:
executing step b) to unmask the masked datum contained in the word that has transited through the internal data bus and to obtain thus an unmasked datum, and
encrypting the unmasked datum, to obtain an encrypted datum, then
storing, on the data storage medium, said encrypted datum without storing on said medium the initialization vector used to unmask said datum, then subsequently
after the encrypted datum has been loaded from the data storage medium and before said datum is moved through the internal data bus:
decrypting the encrypted datum stored on the data storage medium, to obtain a decrypted datum, and
masking the decrypted datum, said masking comprising:
generating a new initialization vector the size of which, in number of bits, is two times smaller than the number of bits of the decrypted datum, then
producing a new mask using the generated new initialization vector, and using the same secret key and executing the same cryptographic function as those used in step a), then
masking the decrypted datum using the produced new mask, to obtain a masked datum, then
moving, through the internal data bus, a word containing the masked datum and the initialization vector wherein which said masked datum was obtained, then
storing, in the internal cache memory, said moved word containing the masked datum and the initialization vector wherein which said masked datum was obtained.

5. The method according to claim 1, wherein the method comprises:
read-out, by the central processing unit, of a datum in a word of the internal cache memory, and
in response to said read-out by the central processing unit:
reconstruction of the mask the size of which, in number of bits, is equal to the number of bits of the datum to be unmasked using the initialization vector contained in the word and using the secret key and by executing the same cryptographic function, then
transmission of the masked datum and of the produced mask to the central processing unit, then
execution, by the central processing unit, of a processing operation on the masked datum to obtain a processed masked datum and of the same processing operation on the reconstructed mask to obtain a processed mask, then
execution of protecting step a) on the processed datum, said involving execution, in addition, between operations B) and C), of an operation of unmasking, using the processed mask, the doubly masked processed datum obtained at the end of operation B), to obtain the masked datum stored in operation C).

6. The method according to claim 1, wherein the method comprises:
read-out, by the central processing unit, of a datum in a word of the internal cache memory, and
in response to said read-out by the central processing unit:
execution of step b) to unmask the masked datum contained in said word, then
transmission of the obtained unmasked datum to the central processing unit.

7. The method according to claim 1, wherein the cryptographic function comprises a permutation function and a substitution function.

8. The method according to claim 1, wherein operation B) of masking a datum and operation G) of unmasking a masked datum each consist in performing an "Exclusive OR" operation between the datum and the produced mask.

9. An electronic computer comprising:
a data storage medium,
a system-on-chip comprising:
an internal cache memory divided into a plurality of words,
a central processing unit able to write a datum to a word of the internal cache memory, an internal data bus through which transit words moved between the internal cache memory and the data storage medium, the size of said bus being equal to the size of one word of the internal cache memory, a first hardware module for masking a datum contained in a word transiting, through the internal bus, between the internal cache memory and the data storage medium, said first masking hardware module being configured to execute, for each datum written to the internal cache memory by the central processing unit, the following operations:

operation A): constructing a new mask the size of which, in number of bits, is equal to the number of bits of the datum to be written, then operation B): masking the datum to be written using the constructed new mask, to obtain a masked datum, then operation C): storing the masked datum, and not the unmasked datum to be written, in a word of the internal cache memory, then a first unmasking hardware module able to unmask the masked datum contained in a word, wherein the internal cache memory is configured to, when a datum must be moved to the data storage medium, deposit on the internal bus the complete word containing the masked datum, wherein:

operation A) of constructing a new mask comprises:

generating a new initialization vector the size of which, in number of bits, is two times smaller than the number of bits of the new datum to be written, then producing the new mask using the generated new initialization vector and using a secret key and by executing a cryptographic function, operation C) of storing the masked datum in a word of the internal cache memory comprises storing, in the same word of the internal cache memory, the initialization vector wherein which said masked datum was obtained, and not storing in the internal cache memory the produced complete new mask, the first unmasking hardware module is configured to execute the following operations:

operation E): extracting the initialization vector contained in the word, operation F): reconstructing the mask the size of which, in number of bits, is equal to the number of bits of the datum to be unmasked using the extracted initialization vector and using the secret key and by executing the same cryptographic function as that used in operation A), then operation G): unmasking the masked datum using the new mask thus reconstructed, to obtain the unmasked datum.

10. A computer according to claim 9, wherein the first masking hardware module and the first unmasking hardware module are interposed between the central processing unit and the internal cache memory in order to mask each datum written by the central processing unit to the internal cache memory and to unmask each datum read from the internal cache memory by the central processing unit.

11. The computer according to claim 10, wherein the computer comprises a second masking hardware module and a second unmasking hardware module that are interposed between the data storage medium and the internal bus, the second unmasking hardware module being able to unmask each datum before it is stored in the data storage medium and the second masking hardware module being able to mask each datum read from the data storage medium before it is deposited on the internal bus.

* * * * *